United States Patent [19]

Fondacci

[11] 4,435,957
[45] Mar. 13, 1984

[54] DEVICE TO REGULATE THE FLOW RATE OF A LIQUID FUEL SUPPLY SYSTEM OF A GAS TURBINE ENGINE

[75] Inventor: Jean-Luc Fondacci, Montgeron, France

[73] Assignee: Societe Nationale d'Etude et de Construction de Moteurs d'Aviation (S.N.E.C.M.A.), France

[21] Appl. No.: 338,093

[22] Filed: Jan. 8, 1982

[30] Foreign Application Priority Data

Jan. 19, 1981 [FR] France ............................ 81 00853

[51] Int. Cl.³ .............................................. F02C 9/28
[52] U.S. Cl. ............................................... 60/39.281
[58] Field of Search ..................................... 60/39.281

[56] References Cited

U.S. PATENT DOCUMENTS

| | | | |
|---|---|---|---|
| 2,869,322 | 1/1959 | Rankin | 60/39.281 |
| 3,195,308 | 7/1965 | McCombs | 60/39.281 |
| 3,374,800 | 3/1968 | Wheeler et al. | 60/39.281 |
| 3,434,395 | 3/1969 | Londal | 60/39.281 |
| 3,557,552 | 1/1971 | Yates | 60/39.281 |
| 3,777,482 | 12/1973 | Canale et al. | 60/39.281 |

FOREIGN PATENT DOCUMENTS 2520874 12/1975 Fed. Rep. of Germany ... 60/39.281
2394680 1/1979 France .

Primary Examiner—Louis J. Casaregola
Attorney, Agent, or Firm—Bacon & Thomas

[57] ABSTRACT

A device to regulate the flow of a fuel supply system for a gas turbine engine, said system being of the type comprising a volumetric pump, a flow regulator element in the outlet of the pump and a return circuit for the fuel connecting the outlet of the pump upstream from the regulator element with the inlet of the pump. The device includes a second flow regulator element in the fuel return circuit and an arrangement of elements to control the passage cross section of the regulator element so that the pressure drop of the liquid fuel at the passage of the first regulator element remains proportional to the discharge pressure of a suitably chosen stage of the air compressor of the engine.

3 Claims, 5 Drawing Figures

DEVICE TO REGULATE THE FLOW RATE OF A LIQUID FUEL SUPPLY SYSTEM OF A GAS TURBINE ENGINE

BACKGROUND OF THE INVENTION

The invention concerns a device to regulate the rate of flow in a liquid fuel supply system of a gas turbine engine equipped with an air compressor. The said system is of the type comprising:
- a volumetric fuel supply pump driven either by the shaft of the engine or by auxiliary means,
- a fuel intake line delivering the fuel from a reservoir to a pump,
- a fuel supply line directing to the combustion chamber of the engine the fuel discharged by the pump,
- a flow regulator element inserted in the supply line and means to assign values determined in the passage section of said regulator element (designated the principal regulator hereinafter),
- and a fuel return circuit connecting the fuel supply line upstream from the principal regulator with the fuel intake line.

The control device of the invention is of the type comprising a second flow regulating element (herein designated the auxiliary regulator) inserted in the return circuit and automatic control means for the passage cross section of the auxiliary regulator. The automatic control elements are means acting on said passage cross section to maintain, while the passage cross section of the principal regulator remains within predetermined limits, the value of the pressure drop of the fuel in the passage of said principal regulator essentially proportional to the value of the pressure of the air discharged by a suitably chosen stage of the compressor.

There is known, for example, from French Patent published under No. 2,394,680, a control device of the above-described type. The return circuit contains at least two auxiliary flow regulators. One is controlled by the discharge pressure of the pump and the other by the discharge pressure of a stage of the compressor. This device is intended to prevent, in transitory operation, incidents such as the overheating or the stall of the compressor. It is a complicated layout because of the number of auxiliary regulators and the fact that said regulators include elastic return means. Its operating mode is poorly defined, as the auxiliary regulators act independently of each other.

SUMMARY OF THE INVENTION

It will be seen hereinbelow that the control device of the invention is a remarkably simple arrangement that makes it possible to maintain, in constant operation (i.e. for a given passage cross section of the principal regulator) a well defined relationship between the flow rate of the fuel and the air pressure. It will further be seen that it ensures good protection against pumping risks of the engine and against the "poor" or "rich" extinction dangers of the combustion chamber. It may thus be used advantageously as an emergency control device in an aircraft turbojet engine.

Advantageously, the control device of the invention consists of:
- a tight enclosure divided into a first chamber and a second chamber by a tight, transverse partition wall, the first chamber being inserted in the fuel return circuit and further containing a fuel inlet orifice and a fuel outlet orifice and the secondary chamber being in communication with the chosen stage of the compressor,
- a first, tight, longitudinally deformable bellows located in the first chamber, fastened at one of its ends to a wall of the enclosure opposite to the fuel outlet orifice, in communication with the fuel supply line downstream from the principal flow regulator and carrying at its free end a valve, which tends to close the outlet orifice of said first chamber when the said bellows is dilated,
- a second, tight, longitudinally deformable bellows, containing no air and located in the second chamber, wherein it is attached by one of its ends to the same wall of the enclosure as the first bellows,
- finally, a lever traversing the separating wall, to which it is joined by means of a tight articulation and joining the free ends of the two bellows to which it is linked by means of articulated joints.

BRIEF DESCRIPTION OF THE DRAWINGS

Further advantages of the control device according to the invention shall become apparent from the descriptions hereinafter, with reference to the drawings attached hereto, wherein.

DESCRIPTION OF THE PREFERRED EMBODIMENTS

Figure 1:
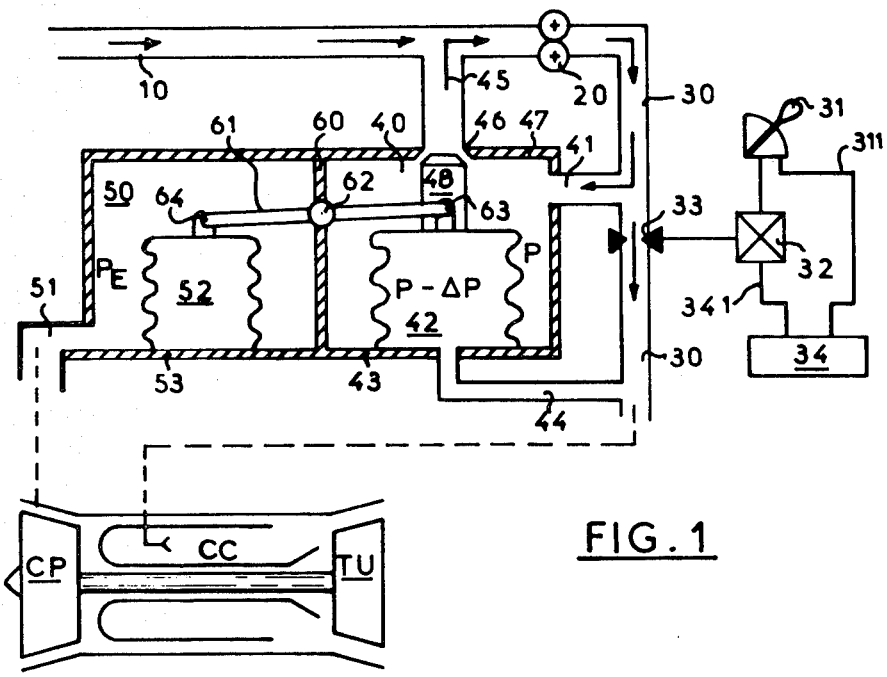
FIG. 1 is a schematic drawing of a fuel supply system for a turbojet engine including the device according to the invention.

Let us consider first FIG. 1. Arrows indicate the direction of flow of the liquid fuel. The fuel, conducted by line 10, is discharged by the volumetric pump 20 into the line 30, which delivers it to the combustion chamber CC of a turbojet engine, the compressor CP and the turbine TU whereof are shown. The flow of the fuel is controlled by means of a handle 31 acting through actuating means 32, on the cross section of the passage through the flow regulator element (for example, a throttling valve), which constitutes the principal regulator 33.

According to the invention, the device for the control of the fuel supply system of FIG. 1 comprises:
- a tight enclosure defining two chambers 40 and 50 separated by a tight median partition 60, the chamber 40 communicating by means of a branch line 41 with the line 30 upstream from the principal regulator 33 and the chamber 50 communicating with a suitably chosen stage of the compressor CP through a pressure intake tube 51,
- a first tight, deformable bellows 42 attached by one of its bottoms (stationary bottom) to a wall 43 of the chamber 40, the inside of which communicates with the line 30, downstream from the principal regulator 33, by means of a tube 44,
- a second, tight deformable bellows 52 attached by one of its bottoms (stationary bottom) to a wall 53 of the chamber 50, which is coplanar with the partition 43, a vacuum being maintained in said bellows, a line 45, connecting the fuel intake line 10 with the chamber 40, into which it opens through an orifice 46 provided in the wall 47 opposite the wall 43, a projection 48 is fastened to the moving end of the bellows 42 and faces the orifice 46, which it closes more or less as a function of the elongation of the bellows, the said projection cooperating with said orifice to constitute the auxiliary flow regulator, finally, a lever 61 passes through the wall 60 to which it is secured by means of a tight articulated joint 62 and the two ends whereof are connected respectively, to the moving end of the bellows 42 by an articulated joint 63, and to the moving end of the bellows 52 by means of an articulated joint 64.

The control device may thus be compared with a balance, the beam of which is the lever 61 and the two plates of which consist respectively of the moving ends of the bellows 52 and the bellows 42.

The equilibrium equations of the device will be written hereinbelow by designating:

S: the variable passage cross section of the principal flow regulator 33,
Q: the fuel flow passing through it,
P: fuel pressure upstream from the regulator 33,
P−ΔP: downstream fuel pressure,
K: the flow coefficient of the regulator according to the known law $Q=K.S.(\Delta P)^{\frac{1}{2}}$
$S_1$: the effective cross section of the bellows 42,
$S_2$: the effective cross section of the bellows 52,
$L_1$: the length of the arm of the lever 61 connecting the articulated joints 62 and 63,
$L_2$: the length of the arm of the lever 61 connecting the articulated joints 62 and 64,
$P_E$: the air pressure prevailing in the chamber 50, i.e. the pressure of air in the section of the compressor CP to which the tube 51 is connected.

When the pump 20 is driven (by the shaft of the turbine engine or by an independent motor), the following may be written, when the device is in equilibrium for a given value of the section S, assigned to the regulator element 33:

$$\Delta P.S_1.L_1 = P_E.S_2.L_2 \quad (1)$$

by neglecting the value of the surface of the projection 48 with respect to the effective cross section $S_1$.

Since $$Q=K.S.(\Delta P)^{\frac{1}{2}} \quad (2)$$

the following is obtained by eliminating ΔP between the two equations:

$$Q/(P_E)^{\frac{1}{2}} = S.K.(S_2.L_2/S_1.L_1)^{\frac{1}{2}} \quad (3)$$

As the parameters K, $S_1$, $L_1$, $S_2$ and $L_2$ are constants, one may write:

$$K(S_2.L_2/S_1.L_1)^{\frac{1}{2}} = K_1 \quad (4)$$

Consequently, when the device is in equilibrium, i.e., when a constant mode of operation is established:

$$Q/(P_E)^{\frac{1}{2}} = K_1.S. \quad (5)$$

For all values of the cross section S of the passage of the regulator element 33, controlled by means of the handle 31, the fuel flow Q injected in the combustion chamber CC thus remains proportional to the square root of the air pressure $P_E$.

But it is also possible to derive from Equation (1) the following:

$$\Delta P = P_E.S_2.L_2/S_1.L_1 = K_2.P_E \quad (6)$$

wherein $K_2$ is also a constant.

A consideration of Equation (6) shows that the device of the invention acts to maintain the pressure drop ΔP proportional to the air pressure $P_E$. FIG. 1 represents only one possible embodiment and many other embodiments maintaining this proportionality are considered to be within the invention.

Thus, when the flow Q varies for any reason whatsoever, for example, because the velocity of the pump 20 changes, Equation (2) shows that the pressure drop ΔP imposed by the regulator element 33 varies in the same manner. There is a lack of equilibrium, but the bellows 42 displaces the projection 48 toward or from orifice 46 to modify the flow of the fuel returning to the line 10 upstream of the pump 20. The lines 41 and 45 form with the regulator element consisting of the projection 48 and the orifice 46, a by-pass, the flow rate variation whereof automatically compensates for any variation in the flow Q passing through the regulator element 33.

Figure 2:
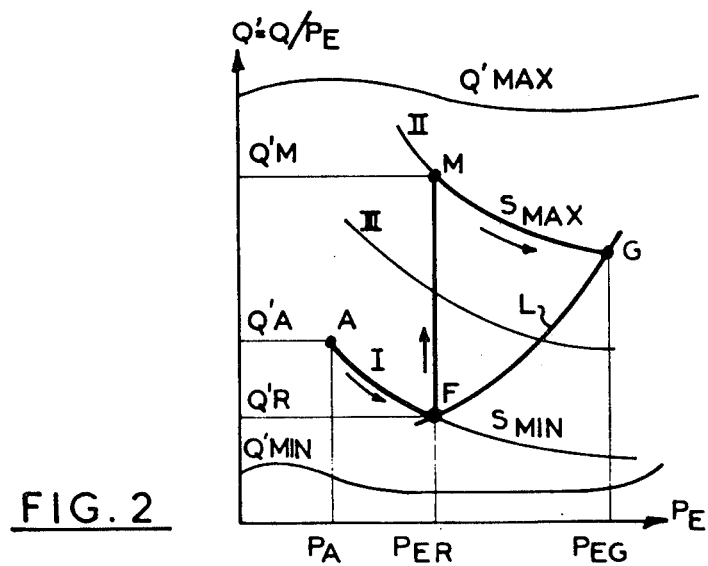
FIG. 2 is an operating diagram.

Let us consider now the diagram of FIG. 2 to explain the manner, wherein, when the section S attains a new value obtained by the actuation of the handle 31, the device passes from one state of equilibrium to another (transitory mode of operation). The diagram displays in the field ($Q/P_E$, $P_E$), the characteristics of the operation and the regulation of a turbojet engine equipped with the device of FIG. 1. In order to simplify the examination of the diagram, the auxiliary variable $Q'=Q/P_E$, which is proportional to fuel richness is chosen as the vertical dimension.

Curve I is the ignition and idling characteristic of the turbojet engine corresponding to the minimum value $S_{min}$ of S of the regulator element 33 and the curve II is the characteristic "full gas" corresponding to the maximum value $S_{max}$ of S. Curve L, which intersects the two curves I and II, respectively, at points F and G, representing the stability rule of the engine. Curve III is an intermediate characteristic.

At the instant of ignition (point A of Curve I), the value of $P_E$ is equal to the value $P_A$ of the atmospheric pressure and the flow of the fuel $Q_A$ injected corresponds, in keeping with Equation (5), to:

$$Q_A = Q'_A.P_A = K_1.S_{min}(P_A)^{\frac{1}{2}} \quad (7)$$

The jet engine starts and the operating point follows the characteristic I to the intersection F of this characteristic with the curve L. The idling flow $Q^R$ then is $$Q_R = Q'_R.P_{ER} = K_1.S_{min}(P_{ER})^{\frac{1}{2}} \quad (8)$$

wherein $P_{ER}$ is the particular value corresponding to the air pressure $P_E$.

One then has:

$$Q_R/Q_A = (P_{ER}/P_A)^{\frac{1}{2}} \quad (9)$$

In order to accelerate the turbojet engine, the pilot acts on the handle 31 to increase the passage cross section S of the principal regulator 33. To demonstrate the essential advantage of the device of the invention, let us consider here the extreme case where this action is brutal enough so that S passes almost instantaneously to its maximum value $S_{max}$ (characteristic II). At this exact moment, maximum flow is attained:

$$Q_M = Q'_M \cdot P_{ER} = K_1 \cdot S_{max}(P_{ER})^{\frac{1}{2}} \qquad (10)$$

It is obviously necessary that this fuel supply value remain below a certain permissible limit for the correct operation of the turbojet engine ($Q'_{max}$ curve). If this is observed, the turbojet engine accelerates rapidly and the air pressure $P_E$ increases, i.e., the operating point follows Curve II to the intersection G of this curve with Curve L. More precisely, the value of the fuel supply passes from:

$$K_1 \cdot S_{max}/(P_{ER})^{\frac{1}{2}}$$

to:

$$K_1 \cdot S_{max}/(P_{EG})^{\frac{1}{2}}$$

The control device of the invention has thus attenuated the action of the handle 31, thus providing an optimum acceleration value of the turbojet engine.

In FIG. 2, in addition to the curve $Q'_{max} = f_1(PE)$ representing the maximum richness in fuel permissible (specifically to avoid any risk of the "rich" extinction of the combustion chamber), the presence of the curve $Q'_{min} = f_2(PE)$ is noted; it represents the minimum fuel supply admissible, in order specifically to prevent any danger of "poor" extinction.

Figure 3:
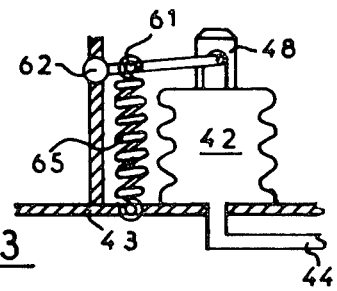
FIG. 3 shows a variant embodiment of the mounting of one of the bellows shown in FIG. 1.
Figure 4:
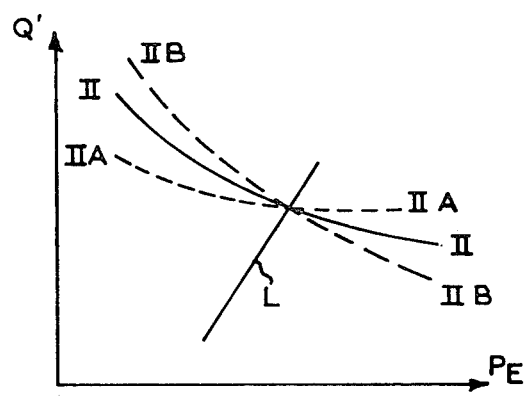
FIG. 4 is a diagram.

It has been assumed heretofore that the rigidity of the deformable system consisting of the bellows 42 and 52 and the lever 61 is zero. It is possible, however, as shown in FIG. 3, in view, for example, of better adapting the response of the device to the operating characteristics of the turbojet engine, to provide the deformable system with a definite rigidity by incorporating therein at least one elastic return element, such as the spring 65, connected with the wall 43 and the lever 61 and opposing the application of the projection 48 against the orifice 46 or applying the projection to the orifice 46 with a given force. The elastic return may be effected by the bellows itself. By the suitable choice of the points of application of the element or elements of return, it is possible, as shown in FIG. 4, to modify the mean slope of a characteristic such as Curve II of FIG. 2, thereby obtaining a new characteristic such as IIA or IIB. It is obvious that there is great freedom in placing the springs (for example, they may be located in the bellows). In view of the fact that there is also a choice of the stage of the compressor CP to which the pressure intake tube 51 is connected, it is seen that there are numerous means available to adapt the operation of the control device of the invention to the characteristics of a given turbojet engine.

Let us consider finally, to complete the present description, various possible embodiments of the principal flow regulator which comprises, in FIG. 1, the regulator 33 actuated by the actuator 32, itself controlled by the handle 31. The actuator 32 in particular consists of a simple mechanical linkage between the handle 31 and the regulator 33, the maximum value of the "full open throttle" being defined by the maximum value of the cross section S of the passage of the regulator 33 and the operation being susceptible to correction by the action of the pilot on the handle 31 in view of the value of the rotating velocity of the jet engine. However, this actuator 32 may also consist of an electric motor (for example, a stepping motor), the rotation whereof is controlled by a computer 34, which receives information signals from an electric connection 311 defining the position of the handle 31 and which processes the control signals it delivers to the motor by means of an electric connection 341.

Figure 5:
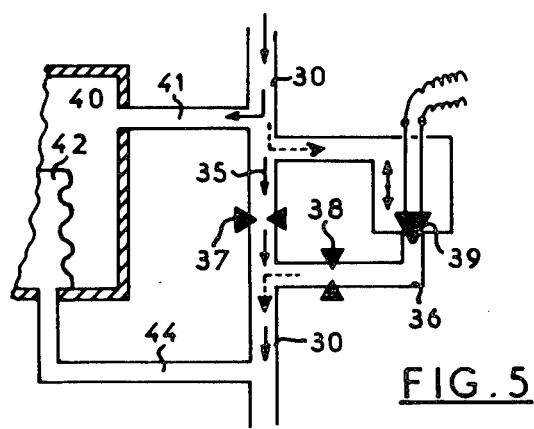
FIG. 5 shows a variant embodiment of the principal regulator shown in FIG. 1.

Still other solutions are possible within the scope of the invention. FIG. 5 shows a simplified embodiment providing, for example, for the control of a pilotless jet engine in two modes of operation. There are found in FIG. 5, the fuel supply line 30, the return line 41 in communication with the chamber 30 and the pressure intake line 44 connected with the inside of the bellows 42. The part 35 of the line 30 between the line 41 and the tube 44 is provided with a branch 36. The regulator 33 of FIG. 1 is replaced by two fixed cross section regulators 37 and 38 (for example, two diaphragms) located, respectively, in the part 34 and in the branch 36. An electrically controlled cock 39 is located therein, making it possible to close it. Its closure defines the "idling ignition" mode of operation, as the only passage cross section for the fuel is that of the regulator 37. Its opening defines the "cruising full throttle" mode of operation wherein the passage cross section of the fuel is equal to the sum of the cross sections of the regulators 37 and 38.

What is claimed is:

1. Flow control device for a liquid fuel supply system of a gas turbine engine equipped with an air compressor, said fuel supply system being of the type comprising a volumetric fuel pump, an intake line delivering the fuel from a reservoir to the pump, a supply line directing the fuel discharged by the pump to the combustion chamber of the engine, a principal flow regulator element in the supply line, means to assign specific values to the passage cross section of said principal regulator element and a fuel return circuit connecting the supply line upstream from the principal regulator with the intake line, wherein said flow control device is an auxiliary regulator comprising:

a tight enclosure divided into a first chamber and a second chamber by a tight, transverse separating partition, the first chamber being in the return circuit of the fuel and also containing a fuel inlet orifice and a fuel outlet orifice; means connecting the second chamber with a selected stage of the compressor;

a first bellows longitudinally deformable and located in the first chamber, fastened by one of its ends to a wall of the enclosure opposite the fuel outlet orifice, its interior being in communication with the supply line downstream from the principal regulator and carrying on its free end a valve tending to close the fuel outlet orifice when said bellows expands;

a second bellows, longitudinally deformable and containing no air, located in the second chamber wherein it is attached by one of its ends to the same wall of the enclosure as the first bellows; and, a lever passing through the partition to which it is attached by means of a tight articulated joint and having its free ends attached to the two bellows by articulated joints such that the auxiliary regulator maintains the value of the pressure drop of the fuel at the passage of the principal regulator essentially proportional to the value of the pressure of the air discharged by the compressor through the connecting means, as the principal regulator varies within predetermined limits.

2. Device according to claim 1, further comprising means to provide the two bellows and the lever with a predetermined rigidity.

3. Device according to either of claims 1 or 2, wherein the principal flow regulator and the means to assign specific values to the passage cross section comprise a U-shaped branch line connected by its two ends with the supply line; a first fixed cross section regulator in the supply line; a second fixed cross section regulator in the branch line; and, means to open and close said branch line.

* * * * *